(12) United States Patent
Miller et al.

(10) Patent No.: US 12,274,211 B2
(45) Date of Patent: Apr. 15, 2025

(54) TILT MONITORING SYSTEM FOR A MOBILE IRRIGATION SYSTEM

(71) Applicant: Lindsay Corporation, Omaha, NE (US)

(72) Inventors: Mark William Miller, Elkhorn, NE (US); Luke Joseph Barker, Omaha, NE (US)

(73) Assignee: LINDSAY CORPORATION, Omaha, NE (US)

( * ) Notice: Subject to any disclaimer, the term of this patent is extended or adjusted under 35 U.S.C. 154(b) by 568 days.

(21) Appl. No.: 17/569,753

(22) Filed: Jan. 6, 2022

(65) Prior Publication Data

US 2023/0210067 A1 Jul. 6, 2023

(51) Int. Cl.
*A01G 25/09* (2006.01)
*A01G 25/16* (2006.01)

(52) U.S. Cl.
CPC .......... *A01G 25/092* (2013.01); *A01G 25/16* (2013.01)

(58) Field of Classification Search
CPC .............................. A01G 25/092; A01G 25/16
See application file for complete search history.

(56) References Cited

U.S. PATENT DOCUMENTS

| | | |
|---|---|---|
| 6,501,422 B1 | 12/2002 | Nichols |
| 8,998,117 B2 | 4/2015 | Bauman et al. |
| 9,055,720 B2 | 6/2015 | Korus |
| 9,538,712 B2 | 1/2017 | Korus |
| 10,936,871 B2 | 3/2021 | Tran et al. |
| 2002/0107582 A1 | 8/2002 | Pollak et al. |
| 2007/0176030 A1 | 8/2007 | Korus |
| 2011/0153161 A1* | 6/2011 | Grabow ............... A01G 25/092 701/41 |
| 2012/0010782 A1* | 1/2012 | Grabow ............... A01G 25/092 701/41 |

(Continued)

FOREIGN PATENT DOCUMENTS

| | | |
|---|---|---|
| EP | 2832206 | 2/2015 |
| WO | 2016187602 | 11/2016 |

OTHER PUBLICATIONS

International Search Report and Written Opinion mailed Apr. 28, 2023 in related PCT Application No. PCT/US2023/010200, 9 pages.

*Primary Examiner* — Scott T Baderman
*Assistant Examiner* — Mario M Velez-Lopez
(74) *Attorney, Agent, or Firm* — HOVEY WILLIAMS LLP

(57) ABSTRACT

A tilt monitoring system for a mobile irrigation system including a sensor and a controller. The sensor is configured to detect a tilt magnitude of the span and generate a corresponding tilt signal. The controller is configured to receive the tilt signal representing the tilt magnitude, generate a deactivation signal representing an instruction to deactivate the drive motor if the tilt magnitude is greater than a tilt threshold, transmit the deactivation signal to the drive motor, generate a notification signal representing a notification that the drive motor has been deactivated due to the tilt magnitude, transmit the notification signal, receive a follow-up input signal representing a follow-up input, generate a follow-up command signal representing a command for implementing the follow-up input, and transmit the follow-up command signal so that the mobile irrigation system implements the follow-up input.

18 Claims, 3 Drawing Sheets

(56) References Cited

U.S. PATENT DOCUMENTS

Figure 1:
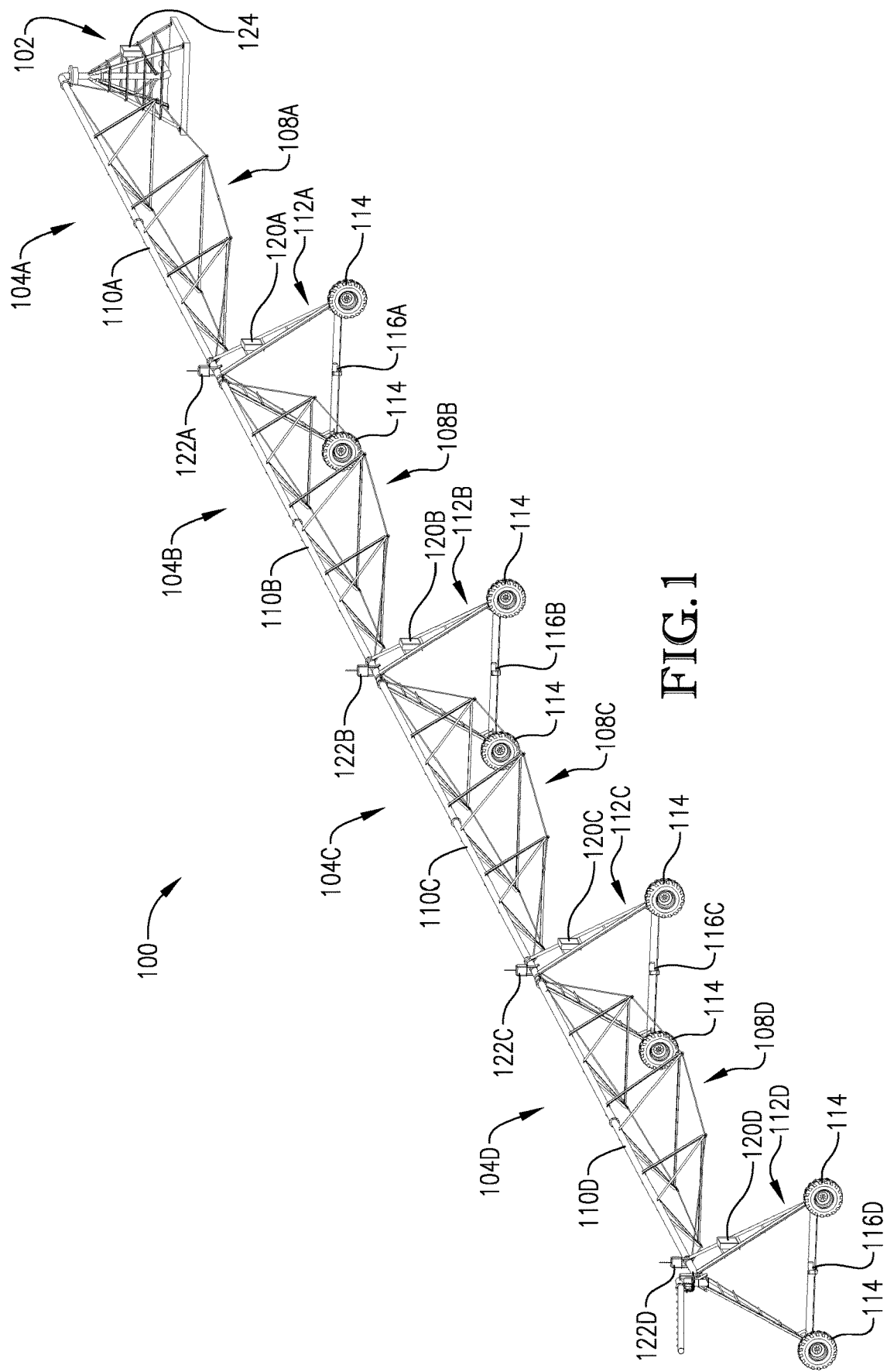

| | | | |
|---|---|---|---|
| 2013/0090772 A1* | 4/2013 | Pfrenger | A01G 25/092 |
| | | | 700/302 |
| 2015/0060580 A1* | 3/2015 | Welch | A01G 25/092 |
| | | | 239/729 |
| 2018/0180740 A1* | 6/2018 | Shaffer | G05D 1/0236 |
| 2018/0184584 A1* | 7/2018 | Song | A01D 34/008 |
| 2019/0230850 A1* | 8/2019 | Johnson | B65G 67/02 |
| 2020/0383283 A1* | 12/2020 | Thatcher | G05B 13/0265 |
| 2020/0396911 A1* | 12/2020 | Stouffer | A01G 25/16 |
| 2020/0396912 A1* | 12/2020 | Stouffer | A01G 25/16 |
| 2021/0059132 A1* | 3/2021 | Korus | B60K 7/0007 |
| 2021/0364632 A1* | 11/2021 | Sagalovich | G06V 20/58 |
| 2022/0030785 A1* | 2/2022 | Miller | H04Q 9/00 |
| 2022/0365496 A1* | 11/2022 | LaRue | G05B 13/0265 |

\* cited by examiner

TILT MONITORING SYSTEM FOR A MOBILE IRRIGATION SYSTEM

BACKGROUND

Mobile irrigation systems often include tilt limiters for stopping their movement if tilt of an outermost mobile irrigation tower exceeds a tilt threshold. Unfortunately, such tilt limiters cannot detect tilt of intermediate mobile irrigation towers. The tilt limiters also only sense tilt in one axis, which often poorly correlates with actual tilt magnitude. Furthermore, such tilt limiters are blind to the cause of the tilt, which can be benign or serious. Similarly, some tilt that does not trigger tilt limiters may still be indicative of other issues such as rut formation.

SUMMARY

Embodiments of the present invention solve the above-mentioned problems and other problems and provide a distinct advancement in the art of mobile irrigation systems. More particularly, the invention provides a mobile irrigation system that includes more comprehensive tilt monitoring of its trusses and mobile irrigation towers.

An embodiment of the invention is a mobile irrigation system broadly comprising a central pivot, a number of spans, and a tilt monitoring system. The tilt monitoring system detects, analyzes, and manages tilt events of the mobile irrigation system.

The central pivot may be a tower, a standpipe, or the like. The central pivot may include a support structure for withstanding radial loads, axial loads, and twisting loads, a non-rotatable vertically extending pipe, and a rotatable elbow.

The spans include a number of truss sections, a number of conduit sections, and a number of mobile irrigation towers. Any number of spans may be used without departing from the scope of the present invention. To that point, spans may be added and removed as an area to be irrigated is increased or decreased.

Each truss section includes a number of beams rigidly connected to one another to form a framework which carries or otherwise supports the conduit sections and other fluid distribution mechanisms that are connected in fluid communication to the conduit. The truss sections may include braces, cross members, cables, and the like.

The conduit sections are connected end-to-end on the truss sections. The conduit sections transport water or other fluids to a number of sprinklers, spray guns, drop nozzles, or other fluid emitting devices spaced along the conduit sections.

Each of the mobile irrigation towers elevates adjacent truss sections and may include an "A-frame" or similar structure, a number of wheels, and a drive motor. Each mobile irrigation tower may also include a controller for activating its drive motor.

The wheels may include conventional circular wheels, skis, skids, tank tracks and wheels, rollers on a track, or any mechanism on which the mobile irrigation towers may travel relative to the ground. In one embodiment, one of every pair of wheels is drivably connected to one of the drive motors and the other wheel is free-spinning.

The drive motors may be constant speed or variable speed electric motors. In some embodiments of the invention, the drive motors may include integral or external relays so they may be turned on, off, and/or reversed. The drive motors are drivably connected to one of the wheels via a drive train including a geared transmission, a variable gear ratio transmission, a continuously variable transmission (CVT), or the like.

The tilt monitoring system includes a number of sensors, a number of controllers, and a number of wireless communication elements. The tilt monitoring system detects comprehensive tilt states (tilt magnitudes, tilt vectors, and/or tilt rates) of the entire mobile irrigation system, analyzes the tilt states, stores the tilt states (for short term trend analysis, long term trend analysis, cross-referencing, tilt profile generation, or the like), generates alerts for a tilt event, and manages the mobile irrigation system according to the tilt states, analysis, or user input in response to the alerts.

The sensors are coupled to the controller and configured to detect a tilt magnitude, which may be a simple angle from level, a tilt direction, a tilt vector, a tilt rate, acceleration, shock, vibration, or any other suitable aspect associated with tilt of one of the truss sections or mobile irrigation towers of the spans.

The sensors may be mounted on the truss sections, conduit sections, mobile irrigation towers, or any other suitable structure whose tilt should be monitored. The sensors may be integrated into the controllers or may be external components.

Each controller may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller may generally execute, process, or run instructions, code, code segments, code statements, software, firmware, programs, applications, apps, processes, services, daemons, or the like.

The wireless communication elements include signal and/or data transmitting and receiving circuits, such as antennas, amplifiers, filters, mixers, oscillators, digital signal processors (DSPs), and the like. The wireless communication elements may establish communication with each other and with remote computing devices wirelessly by utilizing radio frequency (RF) signals and/or data that comply with various communication standards.

The mobile irrigation system may encounter several different types of tilt events. The tilt monitoring system may be able to detect such tilt events, distinguish between them (i.e., qualify the cause of the tilt), and manage the tilt events according to the tilt event type. The tilt monitoring system may be able to detect and distinguish between tilt events and tilt event types such as tilt due to one of the mobile irrigation towers climbing a foreign object (e.g., vehicle or farm implement) in its wheel track, tilt due to one of the mobile irrigation towers going past or being stuck in an end of path barrier, tilt due to rut formation, tilt due to a failure somewhere in the mobile irrigation system such as a runaway motor or a broken drive train, tilt due to tall crops interfering with one of the truss sections and thus resisting movement of one of the spans, and others.

Tilt magnitudes and associated location data may be stored in memory so that the tilt magnitudes are geo-referenced. Other data such as motor speed, pump flow rate, span alignment may also be stored in memory for assisting in analysis of the tilt event. This storage may be done locally, at a centralized memory on the mobile irrigation system, or remotely in a cloud service or remote computing system.

Stored geo-referenced tilt magnitudes may be used to create a tilt trend baseline for multiple locations in the field (e.g., every 0.5 degrees of rotation or every 5 feet of ground movement). This allows the tilt threshold to be set according to field location (and tilt data recorded for a given field location). For example, the tilt threshold could be higher for an inclined area and lower for a flat area instead of a constant tilt threshold for the entire field.

Stored geo-referenced tilt magnitudes may be analyzed for determining tilt event type, tilt event severity, and appropriate corrective actions. For example, geo-referenced average tilt baselines may be accumulated to determine that a wheel track rutting condition is being created.

The tilt monitoring system may also notify a remote user that a tilt event has been detected and prompt the user to select from a list of pre-defined corrective actions or to provide manual input to alleviate the tilt event. The tilt monitoring system may aid the user in selecting a corrective action by reporting a peak tilt magnitude measured during the tilt event (which may be far greater than the tilt threshold value), a tilt magnitude after the mobile irrigation system has stopped (which is useful information because the tilting component may settle once it is no longer being driven forward), and other pertinent information. Corrective action may include, but are not limited to, leaving the mobile irrigation system in its stopped state, reversing the mobile irrigation system, and activating or reversing specific ones of the drive motors to determine if doing so reduces the tilt magnitude. In the case of a wheel track rutting condition, the mobile irrigation system may be permitted to continue operation while the user is prompted to investigate the field conditions.

The above-describe mobile irrigation system and tilt monitoring system provide several advantages. For example, the tilt monitoring system analyzes tilt magnitudes and qualifies tilt events, which increases the effectiveness of follow-up inputs and eliminates unnecessary attention to tilt of the mobile irrigation system. The tilt monitoring system also notifies a remote user of tilt events and allows the remote user to make more informed decisions in addressing tilt events.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Figure 2:
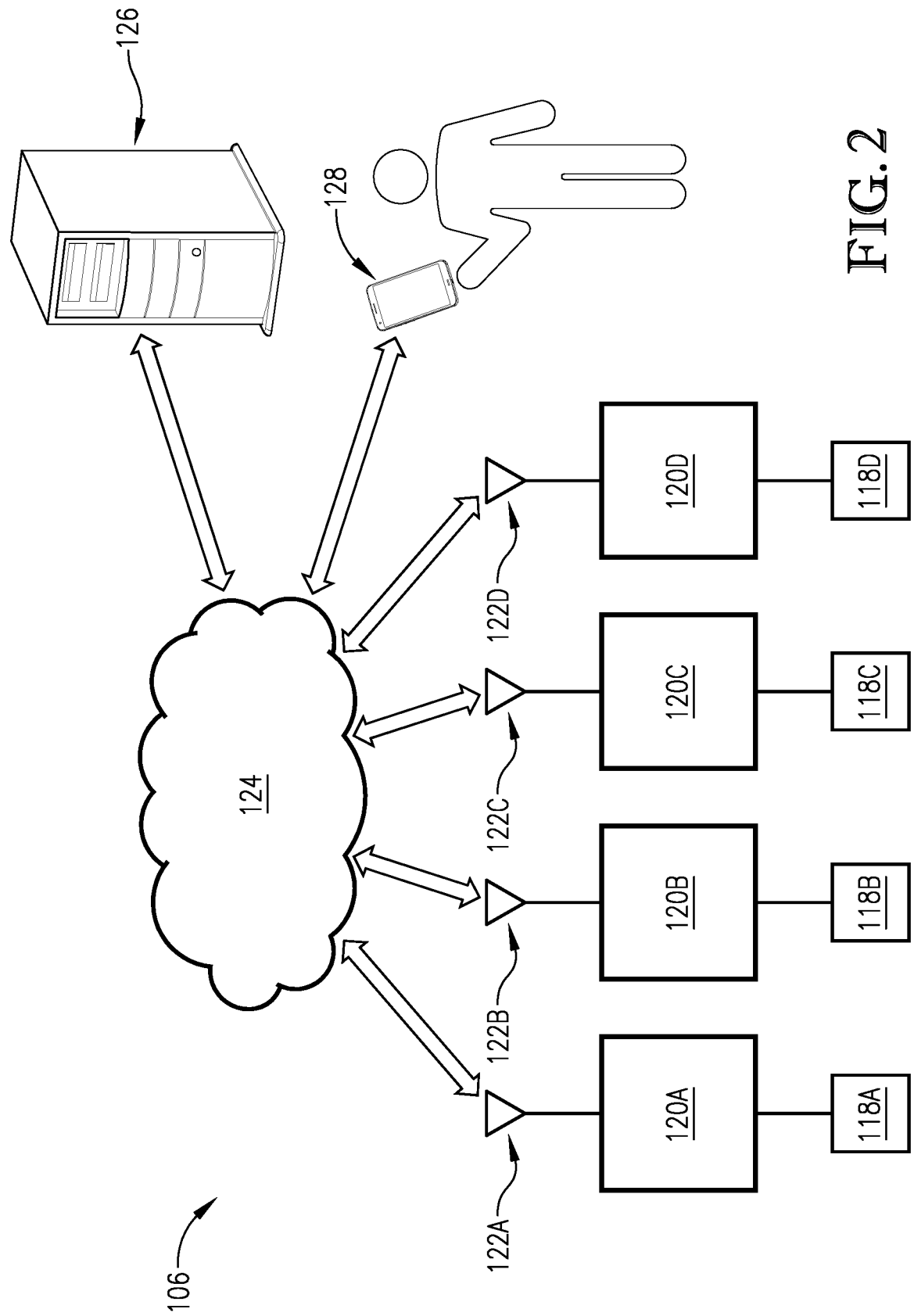
Figure 3:
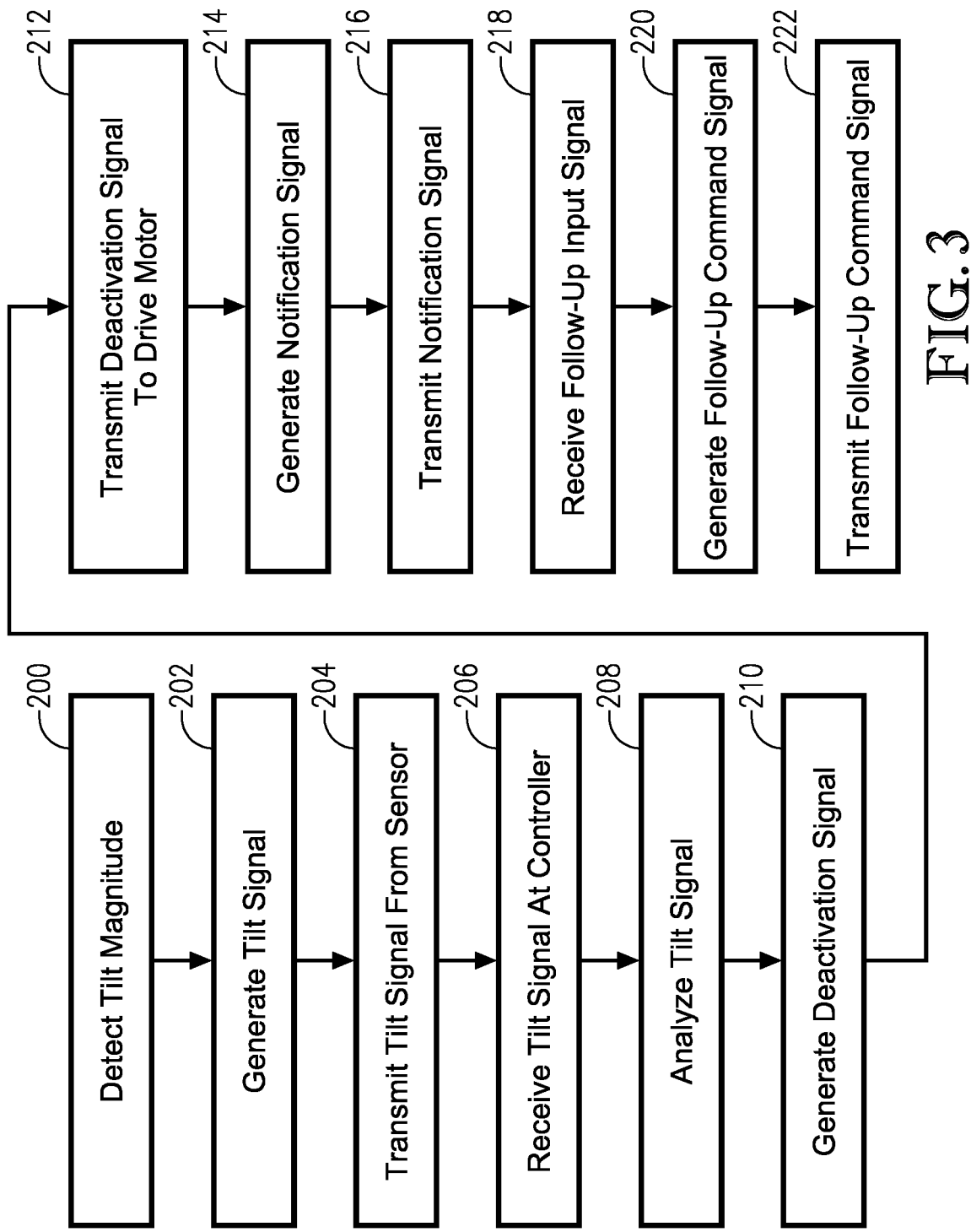

Embodiments of the current invention are described in detail below with reference to the attached drawing figures, wherein:

FIG. 1 is a perspective view of an irrigation system including a tilt monitoring system constructed in accordance with an embodiment of the invention; and FIG. 2 is a schematic diagram of the tilt monitoring system of FIG. 1; and FIG. 3 is a flow diagram including certain method steps of monitoring tilt of the mobile irrigation system of FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a mobile irrigation system 100 constructed in accordance with various embodiments of the invention is illustrated. The mobile irrigation system 100 is a central pivot irrigation system broadly comprising a central pivot 102, a plurality of spans 104A-D, and a tilt monitoring system 106. Other irrigation systems such as linear move irrigation systems may also be used without departing from the scope of the invention.

The central pivot 102 distributes water or other fluids to the spans 104A-D and may be a tower, a standpipe, or the like. The central pivot 102 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the first span 104A to the non-rotatable vertically extending pipe such that the spans 104A-D are free to pivot about the central pivot 102 while remaining connected thereto.

The plurality of spans 104A-D include a plurality of truss sections 108A-D, a plurality of conduit sections 110A-D, and a plurality of mobile irrigation towers 112A-D. Any number of spans may be used without departing from the scope of the present invention. To that point, spans may be added and removed as an area to be irrigated is increased or decreased.

Each of the truss sections 108A-D provides rigidity to or otherwise supports one of the conduit sections 110A-D. The truss sections 108A-D may include braces, cross members, cables, and the like.

Each of the conduit sections 110A-D transport water or other fluids to a plurality of sprinklers, spray guns, drop nozzles, or other fluid emitting devices spaced along the conduit sections 110A-D to apply water and/or other fluids to areas underneath the irrigation system 100. The conduit sections 110A-D may be or may include metal pipes and flexible liners including outlets to which the fluid emitting devices are connected.

Each of the mobile irrigation towers 112A-D elevates adjacent truss sections 108A-D and may include an "A-frame" or similar structure, a number of wheels 114, and a drive motor 116A-D. Each mobile irrigation tower 112A-D may also include a controller for activating the drive motor 116A-D according to a position of the mobile irrigation tower 112A-D or a relative angle of the adjacent span 104A-D.

The wheels 114 illustrated and described herein are merely examples of mechanisms for permitting movement of the mobile irrigation system 100. The term "wheel" or "wheels" as used herein may refer to conventional circular wheels, skis, skids, tank tracks and wheels, rollers on a track, or any mechanism on which the mobile irrigation towers may travel relative to the ground. In one embodiment, each mobile irrigation tower 112A-D includes a pair of wheels with one wheel being drivably connected to one of the drive motors 116A-D and the other wheel free-spinning.

The drive motors 116A-D are substantially similar, so only drive motor 116A will be described further. The drive motor 116A may be a constant speed or variable speed electric motor. In some embodiments of the invention, the drive motor 116A may include integral or external relays so they may be turned on, off, and/or reversed. The drive motor 116A may be drivably connected to one of the wheels 114 via a drive train including a geared transmission, a variable gear ratio transmission, a continuously variable transmission (CVT), or the like.

The tilt monitoring system 106 includes a plurality of sensors 118A-D, a plurality of controllers 120A-D, and a plurality of wireless communication elements 122A-D. The tilt monitoring system 106 detects comprehensive tilt states (tilt magnitudes, tilt vectors, and/or tilt rates) of the entire mobile irrigation system 100, analyzes the tilt states, stores the tilt states (for short term trend analysis, long term trend analysis, cross-referencing, tilt profile generation, or the like), generates alerts for a tilt event, and manages the mobile irrigation system 100 according to the tilt states, analysis, or user input in response to the alerts.

The plurality of sensors 118A-D may be coupled to the controller and are configured to detect a tilt magnitude. The tilt magnitude may be a simple angle from level, a tilt direction, a tilt vector, a tilt rate, acceleration, shock, vibration, or any other suitable aspect associated with tilt of the plurality of spans 104A-D or more specifically the truss sections 108A-D or mobile irrigation towers 112A-D. To that end, the plurality of sensors 118A-D may be accelerometers, gyroscopes (e.g., MEMS gyroscopes), magnetic field sensors, inertial measurement units (IMUs), or the like. The plurality of sensors 118A-D may be single axis tilt measurement devices or capable of include up to 9 degrees of freedom/measurement. For example, the plurality of sensors 118A-D may be 9 degree of freedom IMUs that measure three axes of acceleration, which could be combined into a single acceleration vector; three axes of orientation (roll, pitch, and yaw), which could be combined into a single orientation vector; and three axes of magnetic compass orientation, which could be combined into a single magnetic compass orientation vector.

The plurality of sensors 118A-D may be mounted on the truss sections 108A-D, conduit sections 110A-D, the mobile irrigation towers 112A-D, or any other suitable structure. The plurality of sensors 118A-D may detect tilt of the structure to which they are mounted. The plurality of sensors 118A-D may be integrated into the plurality of controllers 120A-D or may be external components. In the case of external components, they may be hardwired or connected to the controllers 120A-D via wi-fi, Bluetooth™, or other wireless communication standard or network (e.g., network 124; see wireless communication elements 122A-D described below).

The plurality of controllers 120A-D are substantially similar so only controller 120A will be described in detail. Controller 120A may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 120A may generally execute, process, or run instructions, code, code segments, code statements, software, firmware, programs, applications, apps, processes, services, daemons, or the like. The controller 120A may also include hardware components such as registers, finite-state machines, sequential and combinational logic, configurable logic blocks, and other electronic circuits that can perform the functions necessary for the operation of the current invention. In certain embodiments, the controller 120A may include multiple computational components and functional blocks that are packaged separately but function as a single unit. The controller 120A may be in electronic communication with the other electronic components through serial or parallel links that include universal busses, address busses, data busses, control lines, and the like.

The controller 120A may include, perhaps as an embedded device or an integrated device, or be in electronic communication with, a memory element. The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the controller. The memory element may include, or may constitute, a non-transitory "computer-readable medium". The memory element may store the instructions, code, code statements, code segments, software, firmware, programs, applications, apps, services, daemons, or the like that are executed by the controller. The memory element may also store data that is received by the controller 120A or the device in which the controller 120A is implemented. The memory element may further store data or intermediate results generated during processing, calculations, and/or computations as well as data or final results after processing, calculations, and/or computations. In addition, the memory element may store settings, data, documents, sound files, photographs, movies, images, databases, and the like.

The plurality of wireless communication elements 122A-D may include signal and/or data transmitting and receiving circuits, such as antennas, amplifiers, filters, mixers, oscillators, digital signal processors (DSPs), and the like. The wireless communication elements 122A-D may establish communication with each other and with remote computing devices wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE)

802.11 standard such as WiFi, IEEE 802.16 standard such as WiMAX, Bluetooth™, or combinations thereof.

In another embodiment, a single wired or wireless communication element, may be used for communication with the sensors 118A-D. Similarly, a single controller may be shared between the sensors 118A-D, or the controllers 120A-D may be controlled by a master controller. For example, a single controller or a master controller may transmit data, notifications, and other information such as sensor data via a single communication element to an edge of field device or system via a wired or wireless network. The edge of field device or system may then transmit the data, notifications, and other information to the remote computing system 126 or a user's remote computing device 128 and relay data, commands, or information back to the controller or master controller.

The mobile irrigation system 100 may encounter several different types of tilt events. The tilt monitoring system 106 may be able to detect such tilt events, distinguish between them (i.e., qualify the cause of the tilt), and manage the tilt events according to the tilt event type. The tilt monitoring system 106 may be able to detect and distinguish between tilt events and tilt event types such as tilt due to one of the mobile irrigation towers 112A-D climbing a foreign object (e.g., vehicle or farm implement) in its wheel track, tilt due to one of the mobile irrigation towers 112A-D going past or being stuck in an end of path barrier, tilt due to rut formation, tilt due to a failure somewhere in the mobile irrigation system such as a runaway motor or a broken drive train, tilt due to tall crops interfering with one of the truss sections 108A-D and thus resisting movement of one of the spans 104A-D, and others.

Tilt magnitudes measured by the plurality of controllers 120A-D and associated location data may be stored in memory so that the tilt magnitudes are geo-referenced. Other data such as motor speed, pump flow rate, span alignment may also be stored in memory for assisting in analysis of the tilt event. This storage may be done locally, at a centralized memory on the mobile irrigation system, or remotely in a cloud service or remote computing system 126.

Stored geo-referenced tilt magnitudes may be used to create a tilt trend baseline for multiple locations in the field (e.g., every 0.5 degrees of rotation or every 5 feet of ground movement). This allows the tilt threshold to be set according to field location (and tilt data recorded for a given field location). For example, the tilt threshold could be higher for an inclined area and lower for a flat area instead of a constant tilt threshold for the entire field.

Stored geo-referenced tilt magnitudes may be analyzed for determining tilt event type, tilt event severity, and appropriate corrective actions. For example, geo-referenced average tilt baselines may be accumulated to determine that a wheel track rutting condition is being created.

The tilt monitoring system 106 may also notify a remote user that a tilt event has been detected and prompt the user to select from a list of pre-defined corrective actions or to provide manual input to alleviate the tilt event. The tilt monitoring system 106 may aid the user in selecting a corrective action by reporting a peak tilt magnitude measured during the tilt event (which may be far greater than the tilt threshold value), a tilt magnitude after the mobile irrigation system 100 has stopped (which is useful information because the tilting component may settle once it is no longer being driven forward), and other pertinent information. Corrective action may include, but are not limited to, leaving the mobile irrigation system 100 in its stopped state, reversing the mobile irrigation system 100, and activating or reversing specific ones of the drive motors 116A-D to determine if doing so reduces the tilt magnitude. In the case of a wheel track rutting condition, the mobile irrigation system 100 may be permitted to continue operation while the user is prompted to investigate the field conditions.

An exemplary use of the mobile irrigation system 100 will now be described in more detail. First, sensor 118A may detect a tilt magnitude of the span 104A, as shown in block 200. The tilt magnitude may be an angle from horizontal, a tilt direction, a tilt vector, a tilt rate, acceleration, shock, vibration, or any other suitable aspect associated with tilt of the plurality of spans 104A-D or more specifically the truss sections 108A-D or mobile irrigation towers 112A-D.

The sensor 118A may then generate a tilt signal representative of the tilt magnitude, as shown in block 202. The sensor 118A may then transmit the tilt signal, and the controller 120A may receive the tilt signal from the sensor 118A, as shown in blocks 204 and 206. This may be achieved via a wired connection or wireless communication.

The controller 120A may then analyze the tilt signal, as shown in block 208. The analysis may determine whether the tilt magnitude is greater than a tilt threshold. The analysis may also qualify the cause of the tilt. This may include analyzing a series of tilt magnitudes over a short time period to determine whether the tilt is a gradual or abrupt effect. In one embodiment, it may include analyzing a series of tilt magnitudes over an extended time period to determine a changing field condition. In another embodiment, it may include determining a baseline tilt magnitude for a plurality of locations. The tilt threshold may be relative to the baseline tilt magnitude at one of the plurality of locations.

The controller 120A may then generate a deactivation signal representing an instruction to deactivate the drive motor 116A if the tilt magnitude is greater than a tilt threshold, as shown in block 210. The controller 120A may then transmit the deactivation signal to the drive motor 116A, as shown in block 212. This may be done as a preliminary step (before or simultaneously with notifying a user) to prevent potential damage to the mobile irrigation system 210.

The controller 120A may then generate a notification signal representing a notification that the drive motor 116A has been deactivated due to the tilt magnitude, as shown in block 214. The notification may include a prompt for the user to provide a follow-up input. The notification may present options according to the above analysis. For example, an option to continue operation may be provided if the analysis shows that the tilt magnitude is due to formation of a rut and thus does not present an imminent risk. The controller 120A may then transmit the notification signal to the remote computing device 128, as shown in block 216.

The controller 120A may then receive a follow-up input signal representing the follow-up input from the remote computing device 128, as shown in block 218. The follow-up input may be selected from the options designated as a result of the analysis.

The controller 120A may then generate a follow-up command signal representing a command for implementing the follow-up input, as shown in block 220. The controller 120A may then transmit the follow-up command signal so that the mobile irrigation system 100 implements the follow-up input, as shown in block 222. For example, a follow-up input to reverse the mobile irrigation tower 112A may cause the controller 120A to activate the drive motor 116A in reverse.

Functionality of the tilt monitoring system 106 may be adjusted or set via user input. For example, tilt thresholds and sensitivities may be increased, decreased, or overridden. Certain factors in the analysis may be weighted or filtered. For example, tilt thresholds may be decreased during wet conditions. As another example, analysis specific to tall crop interference may be turned off for irrigating short crops.

The above-describe mobile irrigation system 100 and tilt monitoring system 106 provide several advantages. For example, the tilt monitoring system 106 analyzes tilt magnitudes and qualifies tilt events, which increases the effectiveness of follow-up inputs and eliminates unnecessary attention to tilt of the mobile irrigation system 100. The tilt monitoring system 100 also notifies a remote user of tilt events and allows the remote user to make more informed decisions in addressing tilt events.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 110(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A tilt monitoring system for a mobile irrigation system including a span having a mobile irrigation tower driven by a drive motor, the tilt monitoring system comprising:
   a sensor configured to:
      be mounted on the span,
      detect a tilt magnitude of the span, and
      generate a tilt signal representative of the tilt magnitude; and
   a controller communicatively coupled with the sensor and configured to:
      receive the tilt signal representing the tilt magnitude;
      determine a tilt event has occurred based on the tilt magnitude;
      determine a tilt event type of the tilt event from a plurality of tilt event types according to additional data,
      wherein the plurality of tilt event types includes tilt due to climbing a foreign object, tilt due to being stuck in an end of path barrier, tilt due to rut formation, tilt due to failure of at least one of a motor and a drive train, and tilt due to tall crop interference,
      wherein the additional data includes at least one of a motor speed, a pump flow rate, and a span alignment;
      generate a deactivation signal representing an instruction to deactivate the drive motor if the tilt magnitude is greater than a tilt threshold;
      transmit the deactivation signal to the drive motor;
      generate a notification signal representing a notification that the drive motor has been deactivated due to the tilt magnitude, the notification including a prompt for a follow-up input; and
      transmit the notification signal.

2. The tilt monitoring system of claim 1, the controller being further configured to analyze a tilt vector based on the tilt magnitude to determine the tilt event type.

3. The tilt monitoring system of claim 1, the controller being further configured to analyze a series of tilt magnitudes over a short time period to determine the tilt event type.

4. The tilt monitoring system of claim 1, the tilt monitoring system further comprising a plurality of sensors, the sensor being one of the plurality of sensors, the controller being further configured to analyze tilt magnitudes detected by the plurality of sensors to determine the tilt event type.

5. The tilt monitoring system of claim 1, the sensor being further configured to detect a plurality of tilt magnitudes at a location over an extended time period, the controller being further configured to analyze the plurality of tilt magnitudes to determine a changing field condition.

6. The tilt monitoring system of claim 1, the controller being further configured to determine a baseline tilt magnitude for a plurality of locations according to geo-referenced tilt magnitudes, the tilt threshold being relative to the baseline tilt magnitude at one of the plurality of locations.

7. The tilt monitoring system of claim 1, the tilt threshold being adjustable via a user input.

8. The tilt monitoring system of claim 1, the controller being located remotely from the mobile irrigation system.

9. The tilt monitoring system of claim 1, the notification including a final tilt magnitude after the drive motor has been deactivated.

10. The tilt monitoring system of claim 1, the controller being further configured to:
   receive a follow-up input signal representing the follow-up input;
   generate a follow-up command signal representing a command for implementing the follow-up input; and
   transmit the follow-up command signal so that the mobile irrigation system implements the follow-up input.

11. The tilt monitoring system of claim 1, the controller being further configured to generate and transmit a report signal representing a report of at least one of a peak tilt magnitude measured during the tilt event and a tilt magnitude after the mobile irrigation system has stopped.

12. A mobile irrigation system comprising:
   a center pivot;
   a plurality of spans connected in series from the center pivot, each of the plurality of spans including:
      a conduit section configured to transport an irrigation fluid from a fluid source to a field;
      a truss structure configured to support the conduit section; and
      a mobile irrigation tower configured to move the truss structure and the conduit section across the field, the mobile irrigation tower including:

a plurality of wheels for traversing the field; and
a drive motor drivably connected to one of the plurality of wheels;
a tilt monitoring system comprising:
a plurality of sensors including a first sensor configured to:
be mounted on one of the plurality of spans,
detect a tilt magnitude of the one of the plurality of spans, and
generate a tilt signal representative of the tilt magnitude; and
a plurality of controllers including a first controller communicatively coupled with the first sensor, the first controller being configured to:
receive the tilt signal representing the tilt magnitude;
determine a tilt event has occurred based on the tilt magnitude;
determine a tilt event type of the tilt event from a plurality of tilt event types according to additional data,
wherein the plurality of tilt event types includes tilt due to climbing a foreign object, tilt due to being stuck in an end path barrier, tilt due to rut formation, tilt due to failure of at least one of a motor and a drive train, and tilt due to tall crop interference,
wherein the additional data includes at least one of a motor speed, a pump flow rate, and a span alignment;
generate a deactivation signal representing an instruction to deactivate the drive motor if the tilt magnitude is greater than a tilt threshold;
transmit the deactivation signal to the drive motor of the mobile irrigation tower of the one of the plurality of spans;
generate a notification signal representing a notification that the drive motor of the mobile irrigation tower of the one of the plurality of spans has been deactivated due to a tilt magnitude, the notification including a prompt for a follow-up input;
transmit the notification signal;
receive a follow-up input signal representing a follow-up input;
generate a follow-up command signal representing a command for implementing the follow-up input; and
transmit the follow-up command signal so that the mobile irrigation system implements the follow-up input.

13. The mobile irrigation system of claim 12, the first controller being further configured to analyze a series of tilt magnitudes over a short time period to determine the tilt event type.

14. The mobile irrigation system of claim 12, the first controller being further configured to analyze tilt magnitudes detected by the plurality of sensors to determine the tilt event type.

15. The mobile irrigation system of claim 12, the first sensor being further configured to detect a plurality of tilt magnitudes at a location over an extended time period, the first controller being further configured to analyze the plurality of tilt magnitudes to determine a changing field condition.

16. The mobile irrigation system of claim 12, the first controller being further configured to determine a baseline tilt magnitude for a plurality of locations according to geo-referenced tilt magnitudes, the tilt threshold being relative to the baseline tilt magnitude at one of the plurality of locations.

17. The mobile irrigation system of claim 12, the controller being further configured to generate and transmit a report signal representing a report of at least one of a peak tilt magnitude measured during the tilt event and a tilt magnitude after the mobile irrigation system has stopped.

18. A mobile irrigation system comprising:
a center pivot;
a plurality of spans connected in series from the center pivot, each of the plurality of spans including:
a conduit section configured to transport an irrigation fluid from a fluid source to a field;
a truss structure configured to support the conduit section; and
a mobile irrigation tower configured to move the truss structure and the conduit section across the field, the mobile irrigation tower including:
a plurality of wheels for traversing the field; and
a drive motor drivably connected to one of the plurality of wheels;
a tilt monitoring system comprising:
a plurality of sensors including a first sensor configured to:
be mounted on one of the plurality of spans,
detect a tilt magnitude of the one of the plurality of spans, and
generate a tilt signal representative of the tilt magnitude; and
a plurality of controllers including a first controller communicatively coupled with the first sensor, the first controller being configured to:
receive the tilt signal representing the tilt magnitude;
determine a tilt event has occurred based on the tilt magnitude;
determine a tilt event type of the tilt event from a plurality of tilt event types according to:
motor speed,
pump flow rate,
span alignment,
a tilt vector based on the tilt magnitude,
a series of tilt magnitudes detected by the first sensor over a short time period,
a series of tilt magnitudes detected by the first sensor over an extended time period, and
geo-referenced tilt magnitudes detected by the plurality of sensors,
the plurality of tilt event types including tilt due to climbing a foreign object, tilt due to being stuck in an end of path barrier, tilt due to rut formation, tilt due to failure of at least one of a motor and a drive train, and tilt due to tall crop interference;
generate a deactivation signal representing an instruction to deactivate the drive motor if the tilt magnitude is greater than a tilt threshold;
transmit the deactivation signal to the drive motor of the mobile irrigation tower of the one of the plurality of spans;
generate a notification signal representing a notification that the drive motor of the mobile irrigation tower of the one of the plurality of spans has been deactivated due to a tilt magnitude, the notification including a prompt for a follow-up input;
transmit the notification signal;

generate a report signal representing a report of at least one of a peak tilt magnitude measured during the tilt event and a tilt magnitude after the mobile irrigation system has stopped;
transmit the report signal;
receive a follow-up input signal representing a follow-up input;
generate a follow-up command signal representing a command for implementing the follow-up input; and
transmit the follow-up command signal so that the mobile irrigation system implements the follow-up input.

\* \* \* \* \*